Aug. 9, 1938.    J. O'D. SHEPHERD    2,126,144
TRAFFIC CONTROL SYSTEM
Original Filed May 10, 1930    4 Sheets-Sheet 1
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| A | O | O | O | O | O | O | O | O | O | O | O | O | O | O | O |   |   |   |   |   |   |   |   |   |   |   |   |   |   |   | O |
| B | O | O | O | O | O | O | O |   |   |   |   |   |   |   |   | O | O | O | O | O | O | O |   |   |   |   |   |   | O |   |   |
| C |   | O | O | O | O |   |   |   | O | O | O | O |   |   |   |   | O | O | O | O |   |   |   |   | O | O | O | O |   |   |   |
| D |   |   | O | O |   | O | O | O | O |   |   | O |   | O |   |   |   | O | O |   | O | O | O | O |   |   | O |   | O |   |   |
| E |   |   | O | O | O | O | O |   |   |   |   |   | O | O | O |   |   |   | O | O | O | O | O |   |   |   | O | O | O |   |   |
F1G. 1
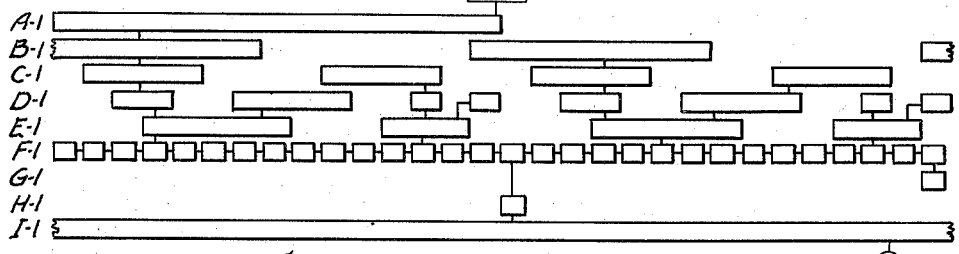
F1G 2
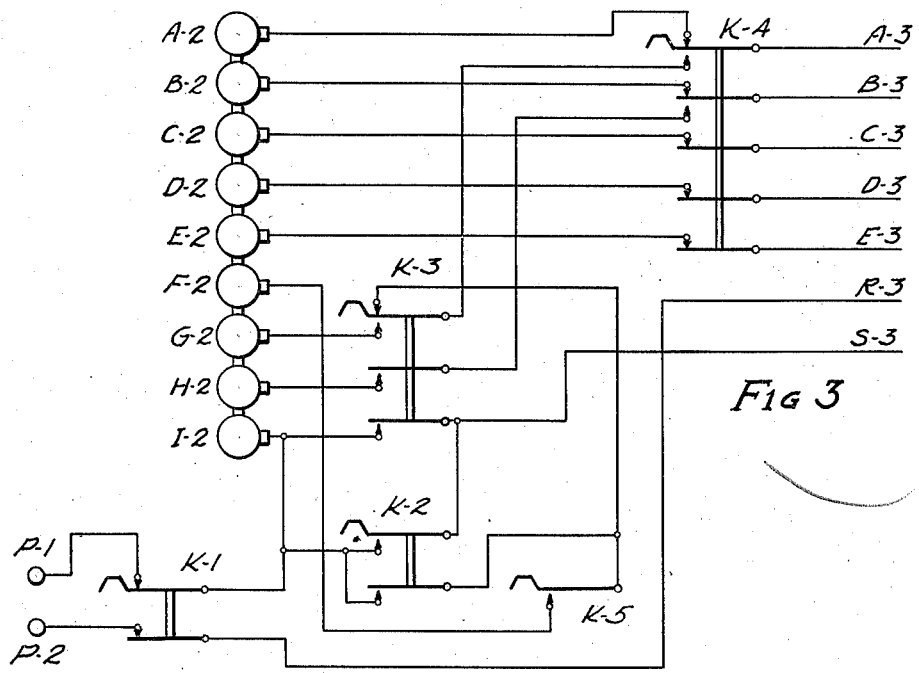
F1G 3
INVENTOR
J. O'Donald Shepherd
BY
Samuel Ostrolenk
ATTORNEY Aug. 9, 1938.   J. O'D. SHEPHERD   2,126,144
TRAFFIC CONTROL SYSTEM
Original Filed May 10, 1930   4 Sheets—Sheet 2

INVENTOR
J. O'Donald Shepherd
BY
Samuel Ostrolenk
ATTORNEY

Aug. 9, 1938.　　　J. O'D. SHEPHERD　　　2,126,144
TRAFFIC CONTROL SYSTEM
Original Filed May 10, 1930　　4 Sheets-Sheet 3

INVENTOR
J. O'Donald Shepherd
BY
Samuel Ostrolenk
ATTORNEY

Patented Aug. 9, 1938

2,126,144

UNITED STATES PATENT OFFICE 2,126,144

TRAFFIC CONTROL SYSTEM

Judson O'D. Shepherd, Atlanta, Ga.

Application May 10, 1930, Serial No. 451,459
Renewed November 24, 1936

17 Claims. (Cl. 177—337)

My invention relates to electrical signalling systems and particularly to electrical traffic controlling signal systems for the purpose of regulating street, highway, railway and other traffic.

The increased use of motor vehicles in recent years has, as is well known, created a serious problem of traffic control. To meet this growing problem, it has been found necessary in many instances to replace the ordinary traffic officer by automatically operated signal lights.

Although the substitution of automatic means for the manual traffic officer has been found to have many advantages such as moving traffic more uniformly than was previously obtained with manual traffic officer control, traffic difficulties continue to grow in spite of the automatic devices due to the many varying conditions to which traffic is subjected, and which cannot be taken care of by the automatic lighting system.

I have discovered that the problems of traffic can best be solved by superimposing on the automatic operation of the traffic light, a manual control, giving the advantages of the automatic coordinated signal lights, as well as the advantages of flexibility of control previously obtained with the manual control officer.

Accordingly, I have as a main object of my invention the provision of means for manually and automatically controlling traffic lights.

An object of my invention is to provide means for selectively controlling a plurality of traffic signalling systems from a central station.

A further object of my invention is to provide an electrical traffic signal system that will provide means whereby street, highway and other traffic signals at a plurality of points can be operated from a single point in such a manner that the traffic movements will be coordinated.

Another object of my invention is to provide means whereby operation of certain or all of the traffic signals can be suspended from the general coordinated function and made to operate independently thereof.

Still a further object of my invention is to provide flexible means for modifying the operation of a system from headquarters and for controlling the sequence and time.

Other objects of my invention are such as may be obtained from a utilization of the combinations and subcombinations as will appear to those skilled in the art from the detailed description of the preferred embodiment hereinafter set forth and as defined by the terms of the appended claims.

In practicing my invention, I provide a trunk line or lines comprising seven conductors each, or less as will be brought out below, connecting the control point, or headquarters, with each of the traffic signal points in such a manner that one trunk line can serve a plurality of signalling systems.

At headquarters an interrupter continuously and repeatedly transmits to the signals comprising a signalling system, combinations of impulsing conditions over certain of the trunk conductors. The receiving apparatus associated with a signalling system operates in response to these code combinations of impulsing conditions to selectively operate the signalling devices in a system.

In the traffic controlling system embodying my invention, I provide an interrupter which normally establishes thirty code combinations of impulsing conditions over five trunk conductors and a common return trunk conductor for each complete traffic operating cycle. The signal apparatus includes relays of a type well known in the telephone and other arts, connected to each of the five trunk conductors and the common return in such a manner that as the control interrupter establishes combinations of circuits between the trunk conductors, a source of current and the common return conductor, the five associated relays will operate in the corresponding combinations. Means are provided whereby certain of the combinations of these latter relays in their operated position control other relays to in turn operate the signal lamp circuits. Each signal is provided with means whereby the codes in response to which it operates, may be readily changed, so that in a traffic cycle the signals comprising the system may individually operate to change their lights to control the flow of traffic at any time or times within the cycle, depending upon which of the thirty codes from which it has been arranged to operate. A complete flexible control of the traffic cycle at any time is thus obtained from headquarters enabling modification of the traffic cycle to conform with changes in traffic.

Referring now to the drawings.

Figure 1 is a chart showing a code which may be used with my invention.

Figure 2 is a development of a code transmitter for transmitting code combinations shown in Figure 1.

Figure 3 is a circuit diagram of the apparatus and circuits at headquarters in a preferred embodiment of my invention.

Figure 4:
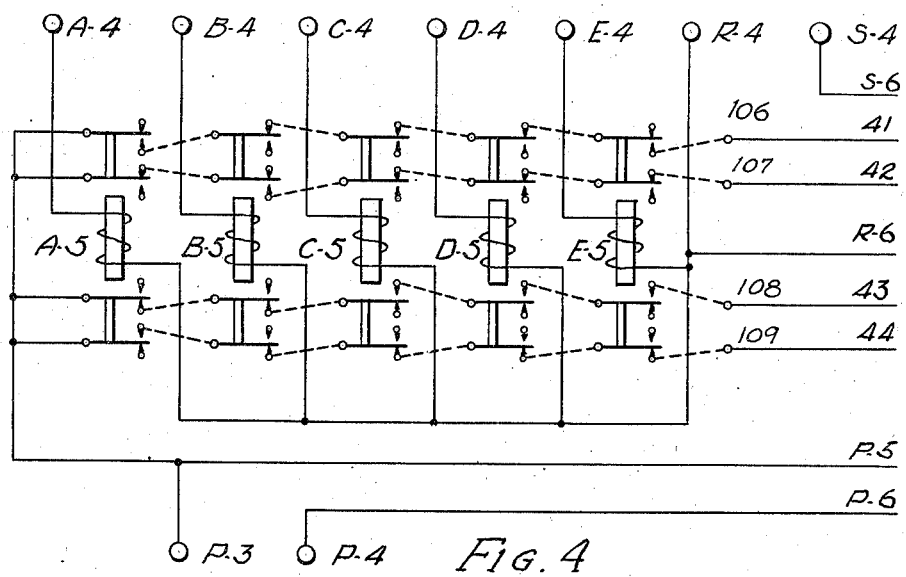
Figure 4 is a circuit diagram of the circuits and apparatus of the receiver arranged to respond to the received code combinations.

Referring now more particularly to Figure 1, the letters A through E, inclusive, represent the five code conductors of the trunk line. The numerals 1 through 30, inclusive, represent the thirty code combinations of conditions which are transmitted for each traffic cycle. The codes transmitted over the five code conductors are shown in the chart, the symbol O indicating one line condition, in this case current flow being transmitted at the time interval which it is shown under and through the conductor which it is shown opposite. For example, at the tenth time increment, current will be transmitted over conductors A, C and D.

An auxiliary code combination, 31, is shown. This code combination provides a special feature for the system and is principally related to means for establishing a general caution condition such as might be desired for a fire alarm as will be described hereinafter.

The code combinations are given for the purpose of illustrating the operation of my invention and those specified may be changed in their sequence in the timing cycle, certain of them can be omitted or they may otherwise be modified without affecting the principle of my invention.

The interrupter employed in my invention to establish the code combinations is shown in developed form in Figure 2. The designations A—1 through E—1, inclusive, indicate the interrupter segments contemplated for the code combinations shown in Figure 1. As the brushes wipe over segments A—1 through E—1, inclusive, the circuit changes specified in the chart of Figure 1 for A through E, inclusive are provided. The interrupter segments shown move, in effect, in the direction indicated by the arrow and under fixed brushes. It will be understood, however, that the reverse operation may be provided, if desired. The interrupter completes thirty code combinations per revolution, code number 31 being provided by special means which are not normally operative. Segment F—1 furnishes interrupted current for purposes hereinafter described. Segments G—1 and H—1 provide codes 31 and 16, respectively, per revolution for purposes also hereinafter described. Segment I—1 is continuous and is for the purpose of supplying power to the several other segments.

The interrupter drum is driven by an electric motor which is not shown. By providing speed control apparatus suitable for the type of motor and electrical power available where my invention would be used, the speed of the interrupter drum can be varied and, in consequence, the time interval of the traffic cycle can be adjusted. The provision of gears or other similar means can be made to accomplish this particular end should a constant speed source of power be employed.

Figure 3 is a circuit diagram showing the apparatus which may be used at headquarters. The interrupter segments A—2 through I—2, inclusive, correspond to segments A—1 through I—1, inclusive, shown in Figure 2. A suitable source of power is connected to power terminals P—1 and P—2 and these power terminals will be considered as a source of electrical power in the circuit operations hereinafter described. Switches K—1 to K—5 control the transmission of special control signals over conductors A—3 to S—3 extending to the remote station in a manner to be described more fully hereinafter. The operation of the apparatus thus far described will now be explained. It will be assumed that the switches are in the position shown and that the interrupter or distributor, Figure 2, is rotating.

A partial circuit can be traced from power terminal P—2 to trunk conductor R—3 which will be referred to as the common return. A second partial circuit can be traced from power terminal P—1 to interrupter segment I—2, which is continuous, and thence to the several other segments over conductors shown in Figure 2. Segments A—2 through E—2, inclusive, will further extend this circuit in accordance with the code combinations heretofore described, through the contacts of switch K—4 to the trunk conductors A—3 through E—3, inclusive. This circuit will be completed through the windings of the several signal relays at the signals and the common return conductor R—3.

Operation of switch K—4 to engage the alternate contacts shown breaks the circuits from A—3 and B—3 and transfers these circuits to the blades of switch K—3. The operation of K—3 in addition to K—4 results in a circuit which can be traced from power terminal P—1, through K—1, through K—3 in its operated position to trunk conductor S—3, through signal relays to be described later, and back over the common return R—3 to power terminal P—2. A second circuit can be traced from power terminal P—1, through switch K—1, to interrupter segment I—2 and thence to segments G—2 and H—2. These latter two segments will in turn extend this circuit in accordance with the development of these segments shown as G—1 and H—1, respectively in Figure 2, through the contacts of switches K—3 and K—4 to trunk conductors A—3 and B—3, respectively, through signal relays to be described, and back to headquarters over the common return conductor R—3.

The operation of K—4 and K—5 results in a circuit which can be traced from P—1, through interrupter segment I—2, segment F—2, switch K—5 operated, switch K—3 normal, switch K—4 operated and thence to trunk conductor A—3 and thence to signal devices to be described. This circuit results in a series of impulses being transmitted to the devices over trunk conductor A—3 in accordance with the development of segment F—1 shown in Figure 2.

Should K—4 and K—2 be operated a continuous circuit can be traced from power terminal P—1 through switch K—2 to trunk conductor S—3 and also through the lower blade of switch K—2, through switch K—3, through switch K—4 to trunk conductor A—3 and thence to the several signals.

Figure 5:
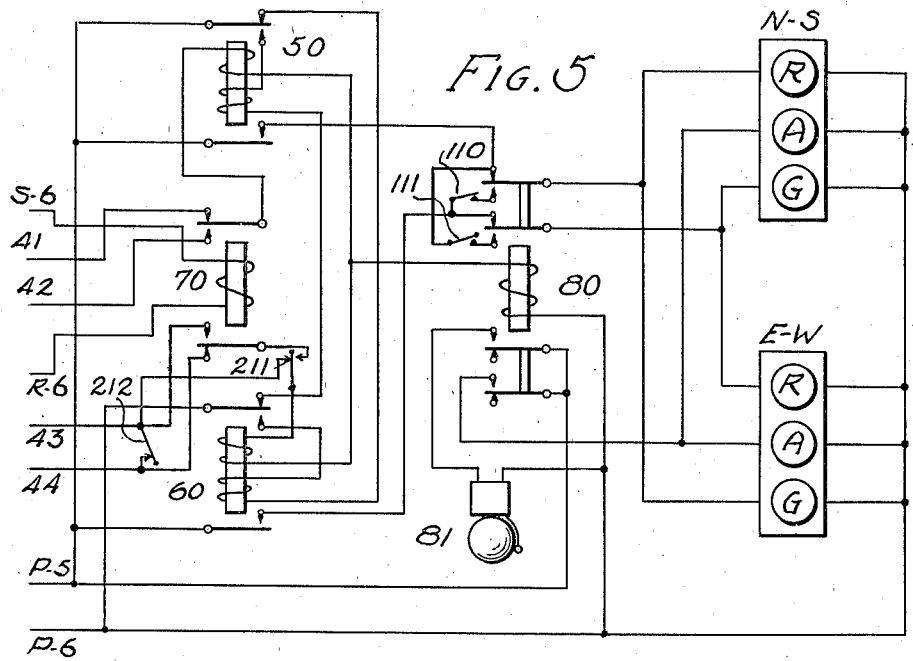
Figure 5 is a circuit diagram of the circuits and apparatus of a signalling system controlled by the receiver in Figure 4.

Figures 4 and 5 show by means of circuit conventions, certain of the apparatus and circuits employed in my invention at each of the signal operating points which, it will be understood, is remote from the headquarters apparatus shown in Figures 1 to 3. The apparatus and circuits shown in Figure 4 pertain particularly to the selective function required of the signals while that shown in Figure 5 applies particularly to the operation of the signal lamps.

In Figure 4, the seven trunk conductor terminals A—4 through E—4, inclusive and R—4 and S—4 are connected to the trunk conductors A—3 through E—3, inclusive and R—3 and S—3, respectively, it will be understood that these connections to the trunk conductors are typical of the connections for the apparatus at each of the signal operating points. Five relays A—5 to E—5 of the general type used in telephone and other arts are connected to trunk conductor terminals A—4 to E—4, respectively and the common return conductor terminal R—4.

As described heretofore, under normal operation, the interrupter at headquarters transmits combinations of impulse conditions over trunk conductors A—3 to E—3 and the common return conductor. The relays A—5 to E—5 are connected to these conductors as shown and as current combinations are received from headquarters, the several relays are energized in combinations corresponding to the impulse combinations transmitted; that is, the several relays will operate in the thirty combinations forming a complete traffic cycle for each revolution of the interrupter drum at headquarters. It is the purpose of these relays to differentiate between the several code combinations in a manner to cause relays such as shown in Figure 5 to change the signal lamp circuits for certain specific code combinations.

Relays in Figure 4 control individual armatures each of which are connected to contacts of the preceding relay armatures with the exception of the armatures of the first relay as is shown. Thus the upper front contact of relay A—5 is connected to the moving armature of B—5, a back contact of B—5 is connected to a moving armature of C—5, a back contact of C—5 to a moving armature of D—5, a back contact of D—5 to a moving armature of E—5 and the front contact of E—5 to terminal 106. Likewise, the moving springs and contacts of each of the other group are connected together in the manner described but with a somewhat different arrangement of connections of the moving armature and contacts for each group. As is well known thirty-one circuits can be controlled by the various combinations of energization of the relays.

Power terminals are shown at P—3 and P—4 and these and associated conductors will be treated as sources of power in describing the operation of my invention.

Assuming for illustration that relays A—5 and E—5 are operated, a partial circuit can be traced through the armature groups. Starting at terminal P—3 it extends through the front contact of A—5, the back contact of B—5, the back contact of C—5, the back contact of D—5, the front contact of E—5 to terminal 106 and thence over conductor 41 to certain relays shown in Figure 5. It will be seen that the armatures and contacts form a chain circuit which is completed upon the operation of relays A—5 and E—5 alone, since either the failure of one of these to operate or the operation of one or more of the other relays will interrupt the chain circuit.

The operation of relays A—5 and E—5 is brought about by means heretofore described in accordance with the code for time increment 14 as shown by Figure 1. The receipt of the thirty-code combinations in sequence periodically results in a circuit being partially completed through the armature group traced above upon and only upon the receipt of code combination 14.

Each of the other armature groups are so connected together that each completes a partial circuit for one and only one of the several code combinations.

In practicing my invention, I provide a cross connecting terminal block connected to the several springs and contacts so that each armature of relays A—5 to E—5, and terminals 106 to 109, can be readily interconnected electrically. The details of this cross connecting terminal block is not a part of my invention since there are several suitable designs in general use in other arts and I have, therefore, omitted any showing thereof.

Each signal device can be arranged by means of the cross connecting terminal blocks so that circuits therefor will be completed by whatever codes desired, these codes being determined by the relation of the individual signal device to all or certain of the other signal devices in the system or systems.

The signal apparatus shown in Figure 5 comprises four relays, a warning bell and two sets of signal lamps N—S and E—W, corresponding to the control of north-south and east-west traffic, respectively, these directions being arbitrarily chosen for illustration to represent the main and cross streets, respectively. The signal lamps may be housed together as with the type of highway traffic signal commonly suspended over street intersections or may be housed separately as shown, or may be multipled with other lamp signals or may have the several lamps separately housed from each other. The exact design of the signal lamps is immaterial to my invention and drawings or description of them has therefore been omitted. For purposes of illustration, red, amber and green lamps, or lenses, are designated by the letters R, A and G, respectively placed within the signal. Electrically operated semaphores or other appropriate mechanical signalling means could, of course, be substituted for these signal lamps.

The operation of the apparatus and circuits shown in Figure 5 can be described by assuming the headquarters apparatus is transmitting code combination 14, and consequently relays A—5 and E—5 of Figure 4 are operated. A circuit can then be traced from power terminal P—3 through the top channel to terminal 106, through conductor 41, the back contact of relay 70, the upper winding of relay 50, the winding of relay 80, conductor P—6 to power terminal P—4. Relays 50 and 80 will operate over this circuit. Conductors P—5 and P—6 will hereinafter be termed power conductors and are assumed to represent a source of electric power. The operation of relay 80 lights the two amber lamps and rings the warning bell, if any, by circuits through its two lower springs, the two power conductors and the lamps and bell respectively.

A moment later upon the suspension of code combination 14 the circuit above described to relay 50 will be broken. Relay 80 will release, thereby breaking the circuits to the amber lamps and the bell. Relay 50 remains locked up by a circuit which can be traced from power conductor P—5, the upper spring of relay 50, the front contact of relay 50, the lower winding of relay 50, the back contact of relay 60 to power conductor P—6. A circuit is also maintained from power conductor P—5, the lower front contact of relay 50 which is operated, the upper back contact of relay 80, the red lamp of signal N—S and the green lamp of signal E—W to power conductor P—6. These circuits will continue as described and the associated lamps will remain lighted until interrupted by the operation of relay 60.

The third channel from the top of Figure 4 is shown, for example, to be cross connected so that a circuit is completed through it upon the operation of relays C—5, D—5 and E—5, corresponding to code 28 of Figure 1. When this code is received by the signal under consideration, a circuit is extended through conductor 43 to the upper winding of relay 60, the winding of relay 80 to the other power terminal in a manner similar to that described for a circuit to relay 50 whereby this latter relay operated initially. Both relays 60 and 80 operate in series over this circuit. Relay 80 breaks the circuit to the N—S red lamp and the E—W green lamp and completes the previously described circuits to the amber lamps and bell, if any. The operation of relay 60 breaks the locking circuit for relay 50 at its back contact, and it releases. Relay 60 partially completes the E—W red lamp circuit and the N—S green lamp circuit, and upon the release of relay 80 these lamps will light. Relay 60 locks up under control of relay 50 which is in its released position, and maintains the lamp circuits described immediately above until relay 50 operates and relay 60 releases.

Relays 50 and 60 continue to alternately operate and lock up under control of the other, thereby alternately maintaining their respective signal lamps lighted as long as codes 14 and 28 are respectively received.

It will be understood that other code combinations will operate other combinations of relays A—5 to E—5 which in turn can control other groups of signal devices shown in Figure 5 over corresponding circuits controlled by other armatures of relays A—5 to E—5 (not shown). It will be clear from the above that predetermined time relations may accordingly be maintained between a large number of independently operating traffic control systems as the distributor at headquarters rotates to send out the codes.

It is desirable to provide means for indicating a general caution condition in a traffic control system applicable to regulating traffic on city streets and my invention provides means whereby this can be accomplished. Referring to Figure 4, it will be seen that the circuit over conductor 44 is completed in response to code 31 which is not normally sent out by the interrupter at headquarters. The operation of switches K—2 and K—4 of Figure 3 result in a continuous impulse being sent out over trunk conductor A—3 as previously described. Likewise, a continuous impulse is sent out over trunk conductor S—3, but this has no particular significance in the operation being described. The receipt of a continuous impulse over conductor A—3 will cause the A—5 relay at each signal now to operate. The signal controlling relays such as 60 for each group as shown in Figure 5 are connected to conductor 44 through switch 212 in its closed position so that circuits extend through conductor 44 to all aforesaid signals, causing relay 60 and relay 80 of said signals to operate and thereby cause all amber lamps of said signals to be lighted and all warning bells to ring, if any.

It is desirable to provide simultaneous operation of a plurality of signals of a system for certain times of the day. My invention provides means whereby this may also be accomplished.

The operation of switches K—2, K—3 and K—4 in Figure 3 results in a continuous impulse being sent out over S—3 and impulses being alternately sent out over trunk conductors A—3 and B—3 in accordance with segments G—1 and H—1 in Figure 2. The continuous impulse over trunk conductor S—3 is received by the signals at terminal S—4 in Figure 4, thence over conductor S—6 to the winding of relay 70 in Figure 5 and thence back to the common return trunk conductor R—3 in Figure 4 by way of conductor R—6. Relay 70 will operate over this circuit, and will thereby transfer the circuit for the upper winding of relay 50 from the selecting circuit including conductor 41 to the conductor 42. The signals for this operation will have relays A—5 and B—5 alternately operating in accordance with the codes previously described. The operation of relay A—5 was previously described as providing a general caution condition, which is brought about by the operation of relays 60 and 80 of Figure 5, at as many intersections included in the system as desirable. A code such as that now being considered will operate relays 60 and 80 momentarily and then will suspend impulses until interrupter segment H—2 sends out an impulse to relay B—5. This closes the selected circuit over conductor 42 extending to a plurality of signalling systems such as shown in Figure 5 to energize relays such as relay 50 of Figure 5, the circuit extending through the front contact of the armature of relay 70 in its operated position. Consequently, relays 50 and 60 of all signals so arranged will alternately operate under control of each other to control their associated signal lamps.

The operation of the signal lamps heretofore described has been in accordance with the sequence of green - amber - red - amber-green-etc. The sequence and arrangement of the lamp circuits is generally known as the type of traffic cycle. There are types of traffic cycles other than the one described. It is possible to arrange the circuits to the springs and contacts of relay 80 in such a manner that the several traffic cycles can be procured. One of these cycles is that whereby the intermediate period when the given red and green lamp circuits are changing, the signal lamps are dark, and this may be procured by omitting the amber lamps and the circuits associated therewith. The circuits heretofore described will apply to the operation of my invention with this latter arrangement provided that portion is omitted which specifically considers the operation of the amber lamps.

Another type of cycle included to illustrate the above, provides the amber lamps to be burning while maintaining the existing red and green lights. This may be procured by closing switches 110 and 111 shown in Figure 5. If, for descriptive purposes, the N—S red and the E—W green lamps are burning, relay 50 will be locked in its operated position by means, and over circuits, heretofore described, and the aforesaid red and green lamps will burn by a circuit from power conductor P—5, the lower contact of relay 50 in its operated position, the back contact of the upper spring of relay 80, the aforesaid lamps to power conductor P—6. At the time the circuits change for the intermediate interval, relays 60 and 80 will operate as previously described and the amber lamps are lighted. A circuit can now be traced from power conductor P—6, through the aforesaid N—S red and E—W green lamps, the upper spring and front contact of relay 80 in its operated position, switch 110, the lower spring and front contact of relay 60 in its operated position to power conductor P—5, and consequently the aforesaid lamps will remain burning. Upon the suspension of the code that resulted in the operation of relay 60, this relay will remain locked up but relay 80 will release, interrupting the circuit described immediately above and, since relay 50 released upon the operation of relay 60, the N—S red lamp and the E—W green lamp will be extinguished. The N—S green lamp and the E—W red lamp will be lighted by circuits previously described upon the release of relay 80. Upon the subsequent operation of relay 50 and relay 80, and the release of relay 60, the latter lamps will be maintained burning for the change period by a circuit traceable through switch 111. Similarly by adjustments of the circuits, the amber lights can be arranged to be burning only between the switching from green to red.

Figure 7:
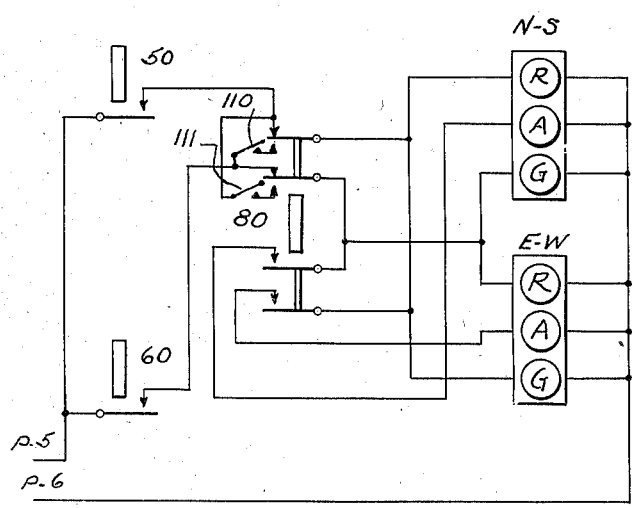
Figure 7 is a modification of the circuits shown by Figure 5 and illustrates one method of securing a different operation of the amber or warning signal.

Figure 7 shows the circuit connections required for this arrangement, the relays operating in the manner described above in this paragraph. It will be seen that during the change interval immediately following the operation of relay 60, the coincidental operation of relay 80 will, over previously described circuits including switch 110 in its closed position, maintain the N—S red and the E—W green lamps illuminated. With the connections shown, a branch of this circuit is extended through the lower made contacts of relay 80 to light the E—W amber lamp. Likewise, during the change interval controlled by the operations of relays 50 and 80 in which the N—S green and the E—W red lamps will be maintained illuminated over previously described circuits including switch 111 in its closed position, the N—S amber light also will be illuminated from a branch of the same circuit extended through the next to the bottom made contacts of relay 80. These arrangements consequently provide by the illumination of the amber as well as the green lamps a warning to traffic which is in motion that the signals are about to change, but withholds notifying the stopped traffic that the signal is about to indicate "go". This is of considerable practical value since many accidents occur at intersections where the amber lamp is displayed to the waiting as well as the moving traffic due to drivers of cars in both traffic groups laboring under the impression that they have the right of way, whereas in the above described arrangement the waiting traffic is not informed of the impending change. Still other adjustments of the type of traffic cycle can be procured.

With traffic control systems it becomes desirable to provide special operating arrangements whereby the requirements surrounding the special application of a system can be satisfied. My invention provides means whereby these so-called features may be procured, and I have shown in Figure 6 certain apparatus and circuits which may be employed to procure the so-called special features hereinafter described and others of a similar type. The circuits and apparatus heretofore described as being located at headquarters are applicable to the provision of the so-called special features. Likewise, the selective apparatus and circuits disclosed in Figure 4 are employed with Figure 6, which in effect may be considered as being a substitute for Figure 5. While the circuits heretofore described in connection with the headquarters apparatus and the selective means shown in Figure 4, apply in relation to Figure 6, the purpose to which certain of the operations of these said circuits will be applied will be somewhat different from that previously described.

Figure 6:
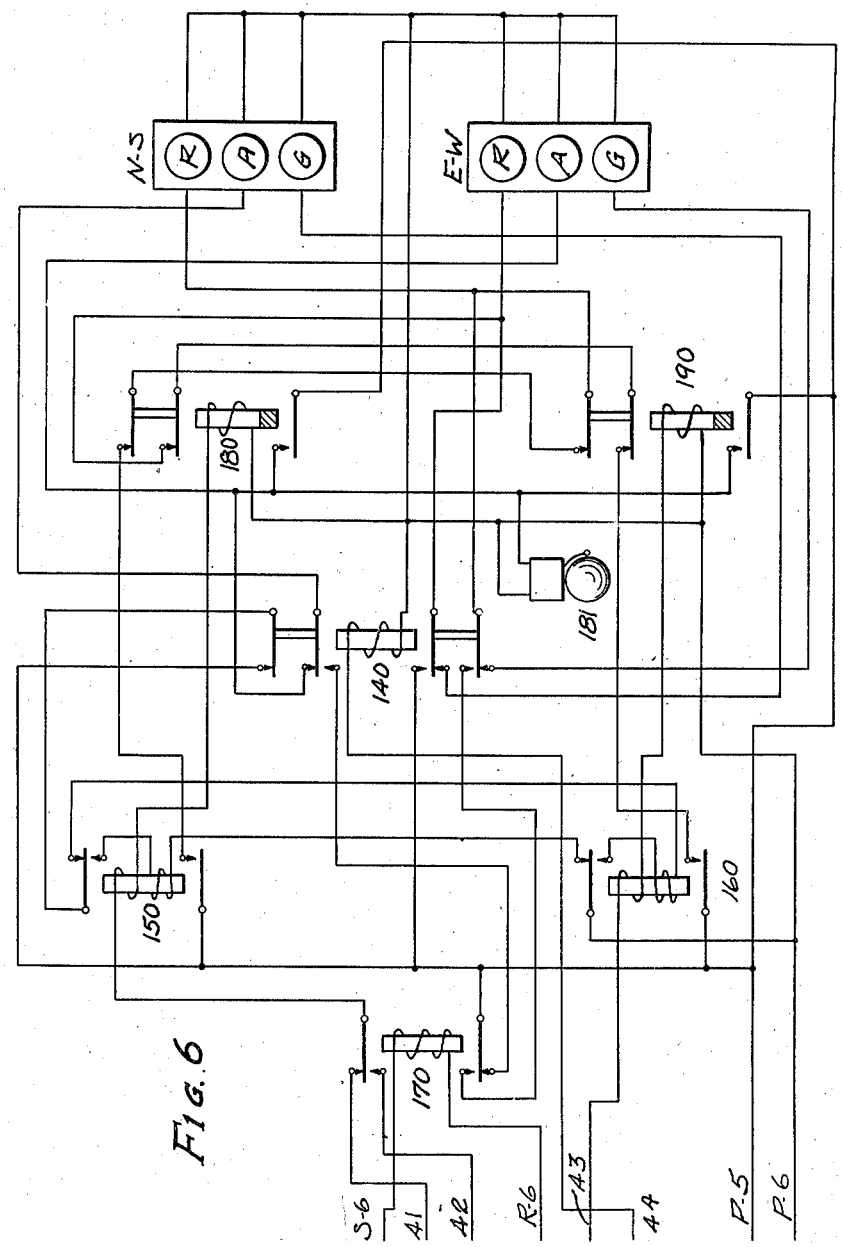
Figure 6 is a modification of the system shown in Figure 5.

Referring now to Figure 6, when a circuit is selected over the conductor 41 of Figure 4, a circuit can be traced through this conductor 41, a back contact of relay 170 in its released position, the upper winding of relay 150, the winding of relay 180 to power conductor P—6, causing both relays 150 and 180 to operate. A circuit can be traced from power conductor P—5, through the lower spring of relay 180 and its front contact, the E—W amber lamp to power conductor P—6, causing the said amber lamp to light. A second circuit can be traced from the aforementioned front contact of relay 180, through a back contact of relay 140, the N—S amber lamp to power conductor P—6, causing this amber lamp to be lighted as well. A third circuit can be traced from the aforesaid front contact of relay 180 through bell 181, if provided, and to power conductor P—6.

Upon suspension of the code which extended a circuit through the upper channel, relay 180 will release thereby opening the circuits described just above to the two amber lamps and the bell, if any. Relay 150 will remain locked over a circuit from power conductor P—5 the upper back contact of relay 140, the upper front contact of relay 150, the lower winding of relay 150, the back contact of relay 160 to power conductor P—6.

Upon receipt of the code which selects conductor 43, a circuit is extended from power terminal P—3, conductor 43, the upper winding of relay 160, the winding of relay 190, and conductor P—6 to power terminal P—4. The operation of relay 160 will interrupt the locking circuit to relay 150 as described in the paragraph just above.

The operation of relay 190 causes the two amber lamps to be lighted and the bell, if any, to ring by circuits similar to those described in the third paragraph above since the lower springs and contacts of relays 180 and 190 are in multiple, and the operation of relay 190 will result in the establishment of the same circuits as did the operation of relay 180. Upon the completion of the code impulses, the chain circuit through the third channel will be broken and relay 190 will release. Relay 160 will remain locked up by a circuit which can be traced from power conductor P—6, the upper front contact of relay 160, the lower winding of relay 160, the back contact of relay 150, the back contact of relay 140 to P—5.

With relay 160 operated and relay 190 released, a circuit can be traced from power conductor P—5 through the lower front contact of relay 160, a back contact of relay 190, a back contact of relay 180 to the junction where the circuit divides, one branch being traceable through the E—W red lamp to power conductor P—6, causing this lamp to be lighted, and the other being traceable through a back contact of relay 140 and through the N—S green lamp to power conductor P—6, causing this lamp to be lighted as well.

When the next circuit is completed through the upper channel, relay 150 will again operate as described and thereby break the locking circuit to relay 160, causing it to release and open the circuit to the N—S green lamp and the E—W red lamp. The operation of relay 150 and relay 180, which is in series with it, will establish circuits previously described, and the cycle of operations will be continued as long as the sequence of code combinations are received by the selecting relays of Figure 4.

In the description of the operation of the apparatus and circuits of Figure 5 it was presumed that an all amber light condition would prevail for a general caution or fire alarm. It may be desirable to provide red lights in all directions for this condition and this may be provided by my invention. The provision of this feature can be brought about by operating switches K—2, and K—4 of Figure 3, which results in a circuit being extended over trunk conductor A—3 and trunk conductor S—3. This would result in the operation of relay A—5 of Figure 4 by circuits heretofore described and relay 170 of Figure 6 will also operate from a circuit from trunk conductor S—3, terminal S—4, of Figure 4, conductor S—6, the winding of relay 170, conductor R—6, terminal R—4 and common return trunk conductor R—3 to headquarters. The operation of relay A—5 will establish a circuit from power terminal P—3 through conductor 44, the winding of relay 140 to power conductor P—6 and thence to power terminal P—4, causing relay 140 to operate.

With relays 170 and 140 operated a circuit can be traced from power conductor P—5, the lower front contact of relay 170, the lower front contact of relay 140 through the N—S red lamp to power conductor P—6, causing the lamp to be lighted. A circuit can also be traced from power conductor P—5, through a front contact of relay 140, the E—W red lamp to power conductor P—6, causing this lamp to also be lighted. Red lights will be maintained in both directions as long as the headquarters switches are maintained in the position described.

It is usual for the relative flow of traffic on the main and side streets to vary during the day. My invention provides means whereby the relative intervals of the red and green lamps for the main direction of traffic flow and that to the side streets can be adjusted at all or any of the signals by certain operations at headquarters. For the purpose of illustrating this operation of my invention, I am assuming that the north-south street represents the main traffic artery and it is desired to lengthen the period that this street allows traffic to move in comparison with the side street; that is, to lengthen the relative interval of green light on the main as compared to the green light interval of the side street. At headquarters it is necessary to operate K—2, which continuously sends current out over trunk conductor S—3, thereby causing relay 170 of Figure 6 to be operated over circuits just previously described. The operation of relay 170 transfers the circuit of the upper winding of relay 150 from the conductor 41 of Figure 4 to conductor 42. Under this condition relay 150 will operate over circuits through the second channel and will therefore respond to the code for which this channel is cross-connected. Since relay 150 operates to cut off the N—S green lamp and to light the N—S red lamp, the conductor 42 can be cross-connected for a code somewhat later in the time sequence than conductor 41, thereby increasing the relative length of time green light shines for the main street traffic in the traffic cycle. The cross-connections shown in Figure 4, for example, cause a circuit to be extended through conductor 41 for the code equivalent to the 14th time increment as indicated by Figure 1, while conductor 42 is cross-connected for the 16th increment. Should it be desired to maintain the main street green or the side street green for the same time period and to allow the other street interval to vary, this can be accomplished by increasing or decreasing the speed of the system to compensate for the relative change of the circuit intervals for the side street green or the main street green, respectively, when the relative intervals are changed as described.

Certain special flashing conditions are sometimes desired in practicing a traffic control system and my invention is arranged so that these can be provided. An example is the provision of flashing amber lights to the main street traffic and flashing red lights to the side street traffic. The operations at headquarters incident to this require operation of switches K—4 and K—5 of Figure 3. This results in impulses being transmitted from the F—2 segment of the interrupter, through switch K—5, the switch K—3, the switch K—4 in its operated position and out to the signals over trunk conductor A—3. Relay A—5 is connected to this trunk conductor and consequently operates and releases in accordance with the impulses transmitted from interrupter segment F—2. The bottom channel of all signals arranged for this operation are cross-connected so that a local circuit is extended through conductor 44, through the winding of relay 140 to power conductor P—6, and relay 140 operates and releases as relay A—5 operates and releases.

With relay 140 operated a circuit can be traced from power conductor P—5, a front contact of relay 140 through the E—W red lamp to power conductor P—6, causing this lamp to be lighted. Another circuit can be traced from power conductor P—5, through the lower back contact of relay 170, a front contact of relay 140, the N—S amber lamp to power conductor P—6, causing this lamp to be lighted. The operation of relay 140 interrupts the holding circuit to both relays 150 and 160, causing either of these that may be operated and locked up to be released. Upon the release of relay 140, the circuits to the lamps described just above will be opened causing the lights to be extinguished. The repeated operation and release of relay 140 will result in the flashing lamp condition described. Since both relays 150 and 160 will be released, the circuits which obtain to light certain of the lamps with either of these operated will of course be open.

My invention provides means whereby the system can be shut down from headquarters. One method which can be used to accomplish this is to supply power to the signals over power conductors passing through a switch or switches at headquarters, the opening of the said switch or switches interrupting the power supply to the several signals and headquarters circuits thereby causing the associated lamps to be extinguished and certain of the operated relays to be released. Other methods of procuring this result permit the employment of an independent source or a plurality of sources of electric power for the several signals, the circuits of which do not pass through headquarters or which serve other purposes and cannot therefore be interrupted. One obvious method of securing this result would be to have a contactor at each signal station, the operating circuit of which would be connected to the common return connector R—3 and an auxiliary conductor provided for the purpose, the operation of said contactor being controlled by a switch at headquarters. The contacts of said contactor would be arranged so that when the contactor is operated, power terminals P—3 and P—4 of Figure 4 would be connected to a local source of electric power, not shown. The opening of the switch at headquarters would disconnect the signal from the power, release the lamp lighting relays and extinguish the signal lamp or lamps that might be lighted. Another method of accomplishing this does not require an auxiliary trunk conductor and contactor. Assume for example that relay 150 of Figure 6 is operated and locked up, therefore resulting in the N—S red and the E—W green lamps being lighted by circuits previously described. Relay 150 is locked up by a local circuit from the local power supply and will remain locked up as long as the local power supply is maintained and the local circuit remains unbroken. The locking circuit to relay 150 passes through a back contact of relay 140. The method of shutting down the system would be to suspend the normal code impulses and to send an impulse to operate relay A—5 of Figure 4, which will cause relay 140 to be operated. The circuits involved in this operation were heretofore described in connection with the procurance of an all caution or fire alarm condition. The operation of relay 140 interrupts the local locking circuit for relay 150, causing it to release. When the impulse that operated relay 140 is suspended, relay 140 will release and, with the code impulses suspended, all relays of Figures 4 and 6 will be released and the lamps of all signals so arranged will be extinguished. The locking circuit for relay 160 also passes through the back contact of relay 140 and had it been locked up the operation of relay 140 would have released it.

My invention provides means whereby the caution or amber light circuit interval can be varied for the change of main street signals to red as compared with the interval of change of cross street signals to red. In operations previously described, relay 180 of Figure 6 operates to complete circuits to the amber lamps just prior to main street red while relay 190 operates to complete circuits to the amber lamps just prior to the cross street red. In the normal operations described, relays 180 and 190 remain operated for intervals approximately equivalent to the time the codes causing their operation are sustained. If relays 180 and 190 are of the slow to release type, the associated amber lamp circuits will be maintained after the interruption of the operating codes. Since these two relays may be provided with independently adjustable releasing intervals, their associated amber lamp circuits can be maintained for corresponding independent intervals. The design of these slow to release relays is not a part of my invention since they are in general use in other of the arts.

As previously pointed out, in practicing my invention the period of a complete traffic cycle can be varied practically between wide limits by changing the speed of rotation of the interrupter drum by changing the speed of the motor or other means. Likewise, the sequence of impulses can be reversed to the signals by reversing the direction of rotation of the interrupter drum by reversing the direction of rotation of the motor or other means, or by providing an auxiliary drum with its several code segments designed to give the reversed sequence of code impulses and which can be substituted in the trunk circuit instead of the drum shown in development by Figure 2. In practicing this feature of my invention, it might be found desirable to arrange the chain circuit connected to conductor 42 of Figure 4 so that the code for which it would be cross connected would be such that it would result in as near as practicable the desired main and side street intervals for both directions of operations.

My invention provides other means for procuring the reverse operation described in the paragraph just above. This may best be described by again referring to Figure 5, the circuits and apparatus of which are employed for purposes somewhat at variance with those previously outlined. Conductor 41 or 42 is connected to the upper winding of relay 50 depending upon whether or not relay 70 is in released position. Likewise by opening switch 212 and changing switch 211 to extend a circuit from the lower armature of relay 70, conductor 43 or 44 is connected to the upper winding of relay 60 depending upon whether or not relay 70 is operated. Assuming that relay 70 is in its released position, relays 50 and 60 and their associated signal lamps are controlled by circuits through the upper and lower chains at back contacts of relay 70. The operation of relay 70 is controlled from headquarters by the operation of switch K—2 which causes current to be continuously extended to operate relay 70 over trunk conductor S—3 as described above.

In consequence of this, the signal lamps will be operated in accordance with whatever codes these two chains are cross connected. Likewise, with relay 70 operated, the lamps will be changed in accordance with whatever codes the second and third chains are cross connected. Since the second and third chains can be cross connected for codes entirely unrelated to those for which the first and fourth are arranged, the response of the signal as regards the time interval within the cycle and the relative intervals of red to green lights can be completely changed by operating relay 70. This change is known in the art as "reset", and the arrangement described as "double reset". By having certain or all of the signals comprising a system arranged for this reset feature, complete adjustment can be made for two entirely different traffic flow conditions.

Figure 8:
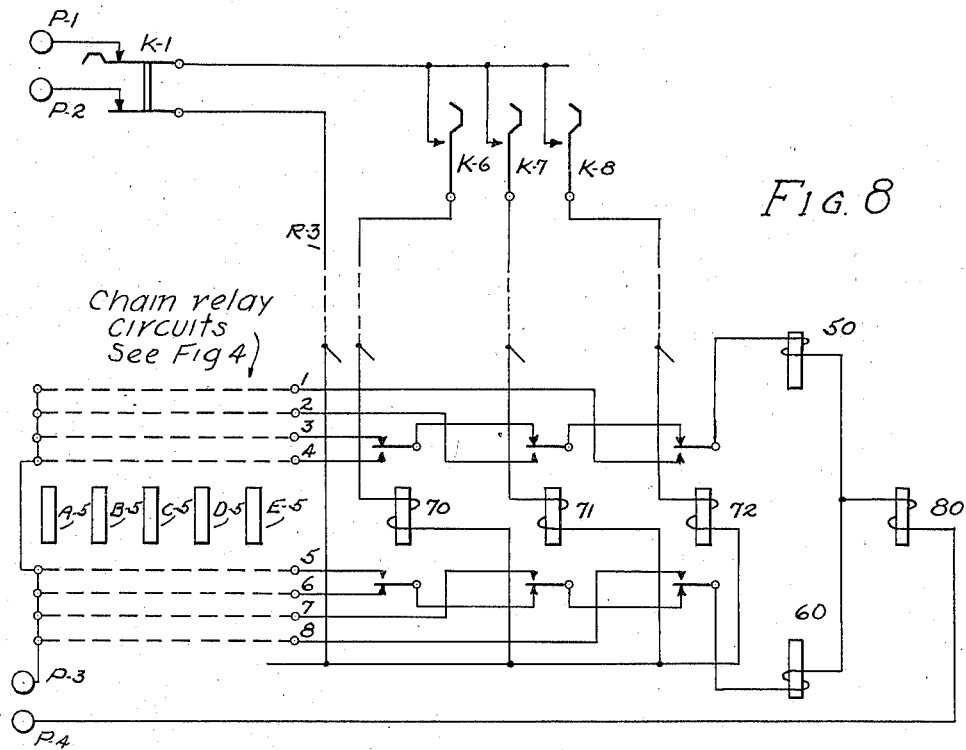
Figure 8 shows means whereby the signal operations can be adjusted from the central station to conform to the requirements of any one of several different traffic flow conditions.

It will readily be seen that another reset can be procured by means similar to those described just above. This would require two more chain circuits through additional springs on relays A—5 through E—5, inclusive, with another relay similar to relay 70 and arranged to be operated from headquarters. This relay would be so placed that when operated its contacts would switch the operating circuits for relays 50 and 60 from the springs of relay 70 to the two additional chain circuits. Likewise the addition of further chain circuits and switching relays would permit additional resets up to the mechanical limitations of the chain relays to operate the chain circuit springs. While it is believed that these arrangements will be apparent to those skilled in the art I have, however, included Figure 8 to clearly show one means of securing multiple resets.

This figure is a modification of Figures 3, 4 and 5, and only the elements required for the particular operation now being considered have been shown in detail, the remainder being indicated by designations corresponding to those used in other of the figures and the operation of these last mentioned elements in this modification are, with minor exceptions to be noted, the same as previously described. Switches K—6, K—7 and K—8, located at headquarters, may be manually selectively operated to effect the operation of relays 70, 71 and 72 at each of the signal stations over obvious circuits including trunk conductors which are common to a plurality of the signal stations. It will be seen that with relays 70, 71 and 72 in their non-operated positions, the signal lighting relays 50 and 60 are responsive respectively to the codes for which chains 3 and 6 are connected. With relay 70 operated, the response is controlled by chains 4 and 5; relay 71 makes operative chains 2 and 7 and relay 72, chains 1 and 8. Since, as described above, each chain circuit can be independently arranged to be responsive to any of the codes, it is evident that the signals at each of the various signal stations can be reset from headquarters to any one of four traffic flow requirements, each reset being completely independent as to the beginning and length of signal displays of the other resets at the particular signal and independent of both the same and other resets at the other stations.

It will be seen that with minor changes obvious to one skilled in the art this multiple reset can be used with other features of my system described herein.

In practicing my invention its application to large areas might require that the code and other impulses be relayed at one or more points. This can be accomplished by having the trunk conductors connected to relays at the relay station in a manner similar to that shown in Figure 4 except that a relay would be provided for the S—3 conductor and a spring or springs and front contacts of each relay would be so connected that upon the operation of each of these relays a circuit would be extended over outgoing trunk conductors corresponding to trunk conductors A—3 through E—3, inclusive and S—3 so that the impulses received by the relaying point would be repeated to outgoing trunk circuits. The use of relays to repeat electrical impulses is broadly applied to many arts and I have therefore not shown drawings of the exact arrangement since it is believed that these circuits are generally well understood by all practiced in the electrical arts.

The several features and operations which I have described have illustrated the flexibility of my invention toward providing operating arrangements which might be desired in coping with traffic conditions.

The employment of five code segments on the controller at headquarters and five associated relays at each signal provides the use of thirty time increments or codes. Should it be found desirable to reduce the number of increments to fifteen, one segment, one trunk conductor and associated signal relay can be omitted. Similarly by adding a conductor, the number can be increased to about sixty.

The several switches shown in Figure 3 are indicated as being manually operated. The use of magnetically operated switches generally obtains in several arts and this type can be employed in my invention with local circuits to the operating magnets extending to a remote point or points from where the system can be controlled. The motor control circuits can also be remotely controlled to change the speed and direction of rotation of the controller drum if desired.

In the application of the system to the control of traffic, the means whereby a sequence of timing code impulses are transmitted to a plurality of signals, each of which can be made to operate from any of the said code impulses, permits the signals on a given street to be arranged to provide the so-called wave or progressive form of control whereby the signals progressively change from red to green at a speed along the street consistent with the speed of traffic. It is possible to reverse the direction of this flow on certain streets for different traffic conditions as illustrated by the requirement for traffic to be expedited in its movement toward the business section of a city in the morning and away from this section in the afternoon. Intersecting streams of traffic can be coordinated by the proper arrangement of the operating times of the signals on the said intersecting streets. It is also feasible to operate the system on a non-coordinated basis during periods of light traffic or for intervals on a non-coordinated basis interspersed from time to time which coordinated periods wherein progressive operation can be provided in either or both directions.

My invention also includes the progressive operation of signalling devices to maintain a continuous uniform flow of traffic. To this end, I provide, by means of my circuit arrangement, progressive operation of a chain of signalling devices in a lane of traffic, each succeeding signalling device operating at a predetermined interval after the preceding device, the time interval being determined by the speed of traffic. Thus, for example, the second signalling device in this chain will operate to indicate go, a fixed interval after the preceding one and just in time to permit approaching traffic to continue. The third signalling device will change to go an instant thereafter, the time of operation being similarly determined by the distance from the preceding signalling device and rate of speed of traffic. In this manner, traffic is moved at a fixed rate and kept in continuous movement.

In such a system, however, traffic moving in the opposite direction would not, unless the distances between each block were uniform, flow continuously. This is not serious during the period the traffic is moving in the opposite direction. It is usual, however, for the heavier traffic to move in opposite directions during different times in the day. To correct for this, I provide for reversing the order of the cycle of operations of the signalling chain by reversing the direction of rotation of the interrupter, or by resetting the signals of the system. In a typical installation the traffic reset feature of my invention would permit high speed progressive movement of traffic toward the business area of a city in the morning and away from it in the late afternoon and a slower two-way operation during the remainder of the day.

My invention is not limited to the particular arrangement of the apparatus and circuits illustrated, but may be variously modified without departing from the spirit and scope of my invention, as set forth in the appended claims. Furthermore, although shown in connection with remote traffic control, it will be clear to those skilled in the art that the novel principle of remote selective control eliminating any need of synchronizing movable members, simplicity of circuits and easy modification of the circuits to meet changing needs disclosed in my system can be readily applied to other signalling systems such as telegraphy, telephony, supervisory control, etc.

I claim:

1. In a street traffic control system; a central station; a plurality of remotely disposed stations; selector mechanism at each of said remotely disposed stations; a transmitter at said central station; circuit connections including a plurality of conductors extending from said transmitter to each of said selector mechanisms; means for operating said transmitter to transmit code combinations over said conductors through repeated cycles to operate all of said selector mechanisms, substantially all of said code combinations consisting of a plurality of impulse conditions transmitted simultaneously by said transmitter; a traffic signalling system including stop and go signalling devices individual to each of said selector mechanisms and located at street intersections; energizing circuit connections individual to each of said signalling devices extending to its associated selector mechanism, each of said last mentioned energizing circuits being closed by its associated selector in response to an individual code combination, all of said selector mechanisms being responsive to code combinations of impulse conditions transmitted by said transmitter, but only predetermined ones being affected in response to any one code combination to complete the energizing circuit for the signalling devices corresponding to that code combination, and means at the central station for coordinating the traffic signals at the intersections along the streets whereby traffic therealong is correspondingly coordinated.

2. In a street traffic control system; a plurality of spaced signalling stations; signalling devices comprising street intersection stop and go indicators at each of said stations; selector units at each of said stations for controlling the signalling devices at the associated stations in response to a predetermined code combination of a plurality of impulse conditions; a central code transmitter; circuit connections including a plurality of conductors extending from said transmitter to said selector units at each of said stations; means for operating said transmitter to transmit a code comprising a simultaneous combination of impulse conditions over said conductors to actuate any one of said signalling devices at any one of said locations independently of any other signalling devices at other of said stations, said transmitter being arranged to transmit a plurality of different code combinations in predetermined cycles and means at said transmitter for controlling the cycle of code combinations transmitted.

3. In a street traffic control system; a central station; selector mechanism remotely disposed from said central station; circuit connections including a plurality of conductors from said central station to said selector mechanism; means for transmitting code combinations over said conductors through repeated cycles to operate said selector mechanism, substantially all of said code combinations consisting of a plurality of impulse conditions transmitted simultaneously by said transmitter; street signalling systems remotely disposed from said central station, each system including stop and go traffic signalling devices located at street intersections; a plurality of circuit connections extending from said selector mechanism to said stop and go signalling devices, said selector mechanism in response to its selective operation by a predetermined code combination selectively closing one of said circuit connections extending therefrom to said stop and go signalling devices to selectively operate said signalling devices and means at the central station for varying the transmitter to centrally control the sequence and timing of the operations of the traffic signals.

4. In a street traffic control system; a central station; a street signalling system remote from said central station, including stop and go signalling devices at a plurality of intersections; selector mechanism comprising a plurality of selector units; circuit connections including a plurality of conductors extending from said central station to said selector units; circuit connections extending from each of said selector mechanism to said stop and go signalling devices variably closed in accordance with the selective operation of their associated selector units; a transmitter at said central station for transmitting repeated cycles of impulse conditions over said conductors, the majority of said transmission comprising a plurality of simultaneous code combinations of impulses and the majority code combinations of impulses and the majority of said code combinations consisting of a plurality of impulse conditions to selectively operate a predetermined one of said selector units whereby a predetermined one of its circuit connections to said signalling devices is closed for selective operation thereof from said central station, said selector units being ineffective in response to other than predetermined codes to effect a closing of its associated signalling devices circuit connections, and means whereby the cyclical transmission of said codes operates all of said signalling devices cyclically to indicate stop and go in an adjustably predetermined coordinated manner with respect to each other.

5. In a street traffic control system; a central station; a transmitter at said central station; a plurality of remotely disposed signalling stations; selector mechanism at each of said remote stations; impulsing circuit connections including a plurality of conductors from said transmitter extending successively to each of said selector mechanism; means for operating said transmitter at said central station for transmitting repeated cycles of code impulse conditions over said conductors from said central station to variably operate all of said selector mechanisms in a predetermined sequence, the majority of said codes comprising a combination of a plurality of impulse conditions; a plurality of street signalling systems remote from said central station, each system including individual street intersection stop and go signalling devices; an energizing circuit individual to each of said signalling devices and individual to a predetermined code; said selector mechanisms at each station operating in response to said received codes, but only predetermined selector mechanisms being effective in response to any one code impulses to selectively close the associated signalling device circuit individual to that code impulses whereby the associated signalling device is selectively controlled from said central station and means at said central station for controlling the transmitter to provide a flexible control of the stop and go signal operations.

6. In a street traffic control system; a central station; a plurality of independent street signalling systems remote from said central station, each system including street intersection stop and go signalling devices; selector mechanism individual to each of said signalling systems; a plurality of circuits extending from each of said selector mechanism to said stop and go signalling devices; conductors extending from said central station to each of said selector mechanisms; means at said central station for transmitting repeated cycles of code impulses, the majority of said code impulses consisting of a plurality of simultaneous impulse conditions over said conductors to variably operate all of said selector mechanisms; means controlled by said operation of predetermined ones of said selector mechanisms in response to said received codes for completing predetermined ones of said circuits extending to said signalling devices and means to cause said signalling devices to be selectively operated under control from said central station in response to said repeated cycles of code impulses to provide flexibly controlled cyclical stop and go signalling indications.

7. In a street traffic control system a central station; a plurality of independent street signalling systems remote from said central station, each system including street intersection stop and go signalling devices; selector mechanism individual to each of said signalling systems; an energizing circuit associated with each of said stop and go signalling devices; circuit connections extending from said central station to each of selector mechanism; means for transmitting successive cycles of code combinations, the majority of said code combinations consisting of a plurality of impulse conditions transmitted simultaneously by said transmitter, over said circuit connections from said central station to selectively operate all of said selector mechanisms, one of said selector mechanisms in response to its complete operation under control of a particular code selecting and closing a corresponding one of said energizing circuits whereby the associated signalling device is selectively operated under control from said central station and means at said central station for controlling the transmitter to provide a flexible control of the stop and go signal operations.

8. In a street traffic control system; a central station; a plurality of independent street signalling systems remote from said central station, each system including street intersection stop and go signalling devices; selector mechanism individual to each of said signalling systems; a plurality of conductors extending from said central station to each of said selector mechanisms; an energizing circuit individual to each of said street intersection stop and go signalling devices; means for transmitting repeated cycles of codes, the majority of said codes consisting of a plurality of impulse conditions, transmitted simultaneously over said plurality of conductors from said central station to selectively operate all of said selector mechanisms, one of said selector mechanisms in response to its complete operation under control of all of the impulses of a particular code selecting and closing a corresponding one of said energizing circuits whereby the associated signalling device is selectively operated under control from said central station and means whereby the signalling devices are cyclically operated individually in response to the cyclical code impulses to indicate stop and go in a predetermined coordinated manner with respect to each other.

9. In a street traffic control system; a central station; a selector mechanism comprising a chain of relays remotely disposed from said central station; circuit connections extending from said central station to said chain of relays; a transmitter at said central station for transmitting successive cycles of code combinations of impulse conditions over said circuit connections to selectively operate the relays comprising said relay chain; signalling systems including individual stop and go signalling devices at the street intersections of the systems and remote from said central station; an energizing circuit individual to each of said signalling devices; armatures controlled by each of said relays comprising said relay chain; circuit connections extending between armatures of said relays and extending between said armatures and said individual signalling device whereby a predetermined combination of operated armatures of said relays comprising said chain completes an energizing circuit for a predetermined signalling device, whereby said signalling devices are selectively operated from said central station and means at said central station for controlling the transmitter to provide a flexible control of said signalling devices from said central station.

10. In a street traffic control system, a central station, a remotely disposed signalling system comprising stop and go signalling devices at the street intersections of the system, selector mechanism associated with said signalling system, circuit connections from said central station to said selector mechanism, an energizing circuit individual to each of said signalling devices extending from said selector mechanism to said signalling devices, means at said central station for transmitting cycles of substantially uniformly spaced code combinations, each of relatively short duration and, the majority of which consist of a plurality of impulse conditions, over said circuit connections to variably operate said selector mechanism, said selector mechanism in response to certain of said received code combinations operating to complete the energizing circuit for a selected one of said signalling devices; means for maintaining said energizing circuit completed for a predetermined interval after the code combination which effected its energization has ceased; means at said central station for operating said code transmitter to transmit the code combinations of impulse conditions in a predetermined sequence whereby said signalling devices are operated in a corresponding sequence and control means at the central station whereby said signalling devices are operated in a different sequence from said first sequence.

11. In a street traffic control system, a central station, a remotely disposed signalling system comprising stop and go signalling devices located at street intersections of the system, selector mechanism associated with said signalling system, circuit connections from said central station to said selector mechanism, an energizing circuit individual to each of said signalling devices controlled by said selector mechanism, means at said central station for transmitting cycles of substantially uniformly spaced code combinations, each of relatively short duration and substantially all of which consist of a plurality of impulse conditions, transmitted over said circuit connections in a predetermined sequence to variably operate said selector mechanism, said selector mechanism in response to said received code combinations operating to complete the energizing circuits for said signalling devices to cause said signalling devices cyclically to indicate stop and go in a predetermined sequence with respect to each other; means for maintaining said energizing circuits completed for predetermined intervals after said received code combinations effecting their energization have ceased; and means at said central station for causing said signalling devices to operate in a different coordinated manner.

12. In a street traffic control system, a central station, a remotely disposed signalling system comprising a plurality of stop and go signalling devices located at street intersections of the system, selector mechanisms associated with said signalling system, circuit connections from said central station to said selector mechanisms, and circuit connections from said selector mechanisms to said signalling devices; means at said central station for transmitting code combinations, substantially all of said code combinations consisting of a plurality of impulse conditions transmitted simultaneously over said first mentioned circuit connections to variably operate said selector mechanisms, said selector mechanisms in response to said impulse conditions operating over said second mentioned circuit connections said signalling devices in a predetermined coordinated manner with respect to each other; and means controlled from the central station for operating said selector mechanisms to operate said signalling devices in flashes.

13. In a street traffic control system; a central station; a plurality of remotely disposed stations; selector mechanism at each of said remotely disposed stations; a transmitter at said central station; circuit connections including a plurality of conductors extending from said transmitter to each of said selector mechanisms; means for operating said transmitter to transmit repeated cycles of code combinations over said conductors to selectively operate all of said selector mechanisms, substantially all of said code combinations consisting of a plurality of impulse conditions transmitted simultaneously by said transmitter; a signalling system including street intersection stop and go signalling devices individual to each selector mechanism; energizing circuit connections individual to each of said signalling devices controlled by said selector mechanism, each of said last-mentioned energizing circuits being closed by its associated selector mechanism in response to an individual code combination, all of said selector mechanisms being responsive to code combinations of impulse conditions transmitted by said transmitter, but only a predetermined selector mechanism being affected in response to any one code combination to complete the energizing circuit for the signalling device corresponding to that code combination; means for operating said transmitter to transmit said repeated cycles of code combinations of impulse conditions in a predetermined sequence whereby the signalling devices in each signalling system are operated cyclically in a predetermined progression and a predetermined coordination with respect to each other and the signalling devices of the other signalling systems; and means at said central station for controlling said code transmitter to change the said predetermined progression and coordination of said signalling systems to cause the signalling devices in each signal system to operate cyclically in another predetermined progression and predetermined coordination with respect to each other and the signalling devices of the other signalling systems.

14. In a street traffic control system; a central station; a remotely disposed signalling system comprising stop and go signalling devices located at street intersections of the system; selector mechanism associated with said signalling system; circuit connections from said central station to said selector mechanism; an energizing circuit individual to each of said signalling devices extending from said selector mechanism to said signalling devices; means at said central station for transmitting cycles of substantially uniformly spaced code combinations, each of relatively short duration and the majority of which consisting of a plurality of impulse conditions over said circuit connections to variably operate said selector mechanism, said selector mechanism in response to said received code operating to complete and maintain completed for an interval independent of the duration of said impulse conditions the energizing circuit for a selected signalling device; means at said central station for operating said code transmitter to transmit the code impulse conditions in a predetermined sequence whereby said signalling devices are operated in a corresponding sequence and in predetermined cycle intervals; and means for varying the operation of said transmitter for varying the cycle intervals.

15. In a traffic control system; a central station; a plurality of remotely disposed traffic signal stations; selector mechanism at each of said remotely disposed stations; a transmitter at said central station; circuit connections extending from said transmitter to each of said selector mechanisms; means for operating said transmitter to transmit in sequence periodically code impulses over said circuit connections to selectively operate all of said selector mechanisms, the majority of said code impulses consisting of a plurality of simultaneous impulse conditions; a signalling system including stop and go signalling devices at street intersections individual to each selector mechanism; energizing circuit connections to said signalling devices controlled by said selector mechanism, each of said last-mentioned energizing circuits normally being closed by its associated selector mechanism in response to an individual predetermined particular code impulse, all of said selector mechanisms being responsive to code impulse conditions transmitted by said transmitter, but only predetermined individual selector mechanisms normally being affected in response to any predetermined particular code impulses to complete the energizing circuits for the signal devices corresponding to the particular code impulses; and means controlled from the central station for causing the selector mechanisms at the remote stations to complete the energizing circuits for the associated signal devices in response to predetermined particular code impulses other than those above mentioned.

16. In a street traffic control system; a central station; a plurality of remotely disposed traffic signalling stations each comprising a receiver and stop and go signalling devices located at street intersections; circuit connections extending from said central station to said signalling stations; means at said central station for transmitting code combinations of impulse conditions over said circuit connections to said signalling stations in repeated predetermined cycles, the majority of said codes comprising a plurality of simultaneous impulse conditions; means at said signalling stations for operating the associated stop and go signalling devices in response to said received code impulse conditions, each of last said means at each of said stations responsive only to particular code impulse conditions for that means to operate an associated stop and go signalling device, each of last said means at each of said stations responsive only to particular code combinations for that means to operate an associated stop or go signalling device, the cyclical transmission of said codes functioning through said receivers to operate all of said stop and go signalling devices cyclically in an individually predetermined coordinated manner with respect to each other; and means controlled from the central station to cause said means at said signalling stations in response to the received codes to operate the associated signalling devices cyclically to indicate stop and go in another individual predetermined coordinated manner with respect to each other.

17. In a street traffic control system, a central station, a plurality of remotely disposed traffic signal stations each having a receiver and stop and go signalling devices located at street intersections and operative under control of their respective receiver; circuit connections common to a plurality of said receivers connecting said receivers with the central station; means at said central station for transmitting different code impulses in sequence in repeated cycles over said common circuit connections to said plurality of receivers; means at said receivers responsive to each of said impulses to control the operation of said receivers; means for operating the signalling devices at said signal stations cyclically to indicate stop and go in an individually predetermined coordinated manner with respect to the signalling devices at the other signal stations under control of predetermined code impulses from said central station impulse transmitting means functioning through said receivers; means controlled from said central station for varying the transmission of said sequence of impulses over said common circuit connections to said plurality of receivers, said receivers being responsive to said change in sequence of impulses received from said transmitter for changing the controlling operation of the signalling devices at said signal stations cyclically to indicate stop and go in another individually predetermined coordinated manner with respect to the signalling devices at the other signal stations under control of said means at said central station functioning through said receivers.

J. O'DONALD SHEPHERD.

CERTIFICATE OF CORRECTION.

Patent No. 2,126,144.    August 9, 1938.

JUDSON O'D. SHEPHERD.

It is hereby certified that error appears in the printed specification of the above numbered patent requiring correction as follows: Page 9, second column, lines 10 and 11, claim 4, strike out the words "and the majority code combinations of impulses"; line 30, claim 5, strike out "impulsing"; line 51, same claim, strike out "impulses"; line 64, claim 6, before "conductors" insert the words a plurality of; page 11, second column, lines 63, 64, 65 and 66, claim 16, strike out the words and comma "each of last said means at each of said stations responsive only to particular code combinations for that means to operate an associated stop or go signalling device,; and that the said Letters Patent should be read with this correction therein that the same may conform to the record of the case in the Patent Office.

Signed and sealed this 22nd day of November, A. D. 1938.

(Seal)

Henry Van Arsdale
Acting Commissioner of Patents.